(12) United States Patent
Reeve et al.

(10) Patent No.: US 11,144,439 B2
(45) Date of Patent: Oct. 12, 2021

(54) EMULATION-BASED TESTING OF A MICROSERVICES ARCHITECTURE

(71) Applicant: International Business Machines Corporation, Armonk, NY (US)

(72) Inventors: John A. Reeve, Winchester (GB);
Mark Peter Frost, Eastleigh (GB);
Paul S. M. Thorpe, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/781,592

(22) Filed: Feb. 4, 2020

(65) Prior Publication Data

US 2020/0174915 A1 Jun. 4, 2020

Related U.S. Application Data

(63) Continuation of application No. 15/841,428, filed on Dec. 14, 2017, now Pat. No. 10,592,403, which is a
(Continued)

(51) Int. Cl.
*G06F 11/36* (2006.01)
*G06F 17/17* (2006.01)
(Continued)

(52) U.S. Cl.
CPC ...... *G06F 11/3688* (2013.01); *G06F 11/3684* (2013.01); *G06F 11/3692* (2013.01);
(Continued)

(58) Field of Classification Search
CPC .. G06F 11/36; G06F 11/3664; G06F 11/3688; G06F 11/3692; G06F 11/3696
See application file for complete search history.

(56) References Cited

U.S. PATENT DOCUMENTS 8,103,913 B2   1/2012   Zambrana
8,677,327 B2   3/2014   Huang
(Continued)

OTHER PUBLICATIONS

Ghahrai, A; Testing Microservices—A Beginner's Guide;Retrieved from Internet: URL: http://www.testingexcellence.com/testing-microservices-beginners-guide/; Apr. 19, 2017; 7 pages.
(Continued)

*Primary Examiner* — Joseph O Schell
(74) *Attorney, Agent, or Firm* — Schmeiser, Olsen & Watts; Nicholas L. Cadmus

(57) ABSTRACT

A method for integration-testing a microservices-based application is performed by an automated software-testing system by using mock software entities. The mock entities emulate the behavior of other microservices or external software applications that would normally interact with the tested microservices in a production environment. The mock entities are managed by a mock server that communicates with the test system through a messaging system. The mock server determines how the mock entities should respond to the tested application's service requests by referring to test guidelines stored in a behavior store. During testing, the test system dynamically updates the behavior store in response to the tested application's service requests and to other indicators of the current state of the tested application. If the tested application interacts with the mock entities during the test as expected, the test system deems the application to have passed the integration test.

20 Claims, 3 Drawing Sheets

Related U.S. Application Data continuation of application No. 15/817,364, filed on Nov. 20, 2017, now Pat. No. 10,592,402.

(51) Int. Cl.
    *G06K 9/62*     (2006.01)
    *G06N 3/08*     (2006.01)

(52) U.S. Cl.
    CPC .......... *G06F 11/3696* (2013.01); *G06F 17/17* (2013.01); *G06K 9/6219* (2013.01); *G06K 9/6256* (2013.01); *G06N 3/08* (2013.01); *G06F 11/36* (2013.01); *G06F 11/3664* (2013.01)

(56) References Cited

U.S. PATENT DOCUMENTS

| | | | |
|---|---|---|---|
| 9,053,084 B1 | 6/2015 | Desai | |
| 9,959,198 B1* | 5/2018 | Jha | G06F 11/3664 |
| 10,089,219 B1* | 10/2018 | Bates | G06F 9/451 |
| 10,268,566 B2* | 4/2019 | Merkle | H04L 67/10 |
| 10,289,538 B1* | 5/2019 | Dwivedi | G06F 8/60 |
| 2009/0007073 A1* | 1/2009 | Huang | G06F 11/3696 717/124 |
| 2009/0089039 A1* | 4/2009 | Shufer | G06F 11/3664 703/23 |
| 2015/0074647 A1 | 3/2015 | Levi | |
| 2015/0100946 A1 | 4/2015 | Brunswig | |
| 2015/0363215 A1* | 12/2015 | Versteeg | G06F 11/3684 703/23 |
| 2017/0180238 A1* | 6/2017 | Telle | G06F 11/3058 |
| 2017/0300402 A1* | 10/2017 | Hoffner | G06F 11/3664 |
| 2018/0276111 A1* | 9/2018 | Datta | G06F 11/3696 |
| 2019/0155721 A1 | 5/2019 | Reeve | |
| 2019/0156199 A1 | 5/2019 | Reeve | |

OTHER PUBLICATIONS

Labriola, Donald J.; List of IBM Patents or Patent Applications Treated as Related;1 page.

Pickens, T; Testing Strategies for Microservices; Retrieved from Internet: URL: https://www.credera.com/blog/technology-insights/open-source-technology-insights/testing-strategies-for-microservices/; Nov. 6, 2015, 8 pages.

quora.com; What Is the Recommended Approach to Do Integration Test for Microservices?;Retrieved from Internet: URL: https://www.quora.com/What-is-the-recommended-approach-to-do-integration-test-for-microservices; Jul. 4, 2017; 2 pages.

Wikipedia; Publish-Subscribe Pattern; historical version published Nov. 2017; https://en.wikipedia.org/w/index.php?title+Publish%E2%80%93subscribe_pattern&oldid=810715901; 4 pages.

* cited by examiner

EMULATION-BASED TESTING OF A MICROSERVICES ARCHITECTURE

CROSS REFERENCE TO RELATED APPLICATIONS

This application is a continuation application claiming priority to Ser. No. 15/841,428 filed Dec. 14, 2017, now U.S. Pat. No. 10,592,403 issued Mar. 17, 2020, which is a continuation application claiming priority to Ser. No. 15/817,364, filed Nov. 20, 2017, now U.S. Pat. No. 10,592,402 issued Mar. 17, 2020, the contents of which are hereby incorporated by reference.

BACKGROUND

The present invention relates in general to automated testing of software applications and in particular to a method for integration testing of applications that are based on a microservices architecture.

A microservices architecture distributes functionality of an application across a set of interconnected standalone processes called microservices. Each microservice may operate as a black box, providing distinct functionality that is exposed to other microservices by a strictly defined interface.

This allows each microservice to be tested in isolation before performing testing the entire application as an integrated set of microservices. Isolation testing a microservice is relatively straightforward, using dummy "mock" processes to submit input to the microservice through its formal interface and then determining whether the microservice responds through the interface with expected output.

Integration testing involves comprehensive end-to-end testing of the entire application, including testing of the application's interactions with external systems. In some cases, integration testing may comprise testing each subsystem of the application, where each subsystem consists of a subset of the application's microservices. Testing a subsystem in this way requires creation of functioning "mock" microservices that exchange data with the subsystem.

Tools exist for creating mock processes to be used in isolation testing of a single microservice. However, because testing a subsystem can be so much more complex than testing an isolated microservice or component, there is no easy way to generate an integrated set of microservices necessary to perform integration testing on a subsystem or application that itself comprises many microservices.

SUMMARY

An embodiment of the present invention provides a method for automated integration testing with mock microservices, the method comprising a specialized test system, of an automated application-testing mechanism, performing integration testing on microservice-based applications, receiving a request from the automated testing mechanism to perform an integration test on an integrated subsystem of the microservice-based application. In response, the integration-test system launches a mock server that creates and manages mock microservices and applications. These mock entities emulate the operation of corresponding real-world entities with which the tested subsystem would normally interact after deployment. The mock entities intercept service requests from the tested subsystem and forward them through a messaging system to the test system. The test system determines an expected response to each service request by referring to guidelines stored in a behavior store. The test system may dynamically update this behavior store during the integration test as required in order to identify authentic responses to particular service requests. At the conclusion of the test, the system analyzes its communications with the tested subsystem to determine whether the integrated subsystem exhibited expected behavior during testing. If so, the test system notifies its parent automated application-testing mechanism that the tested subsystem has passed the integration test.

DETAILED DESCRIPTION

Figure 1:
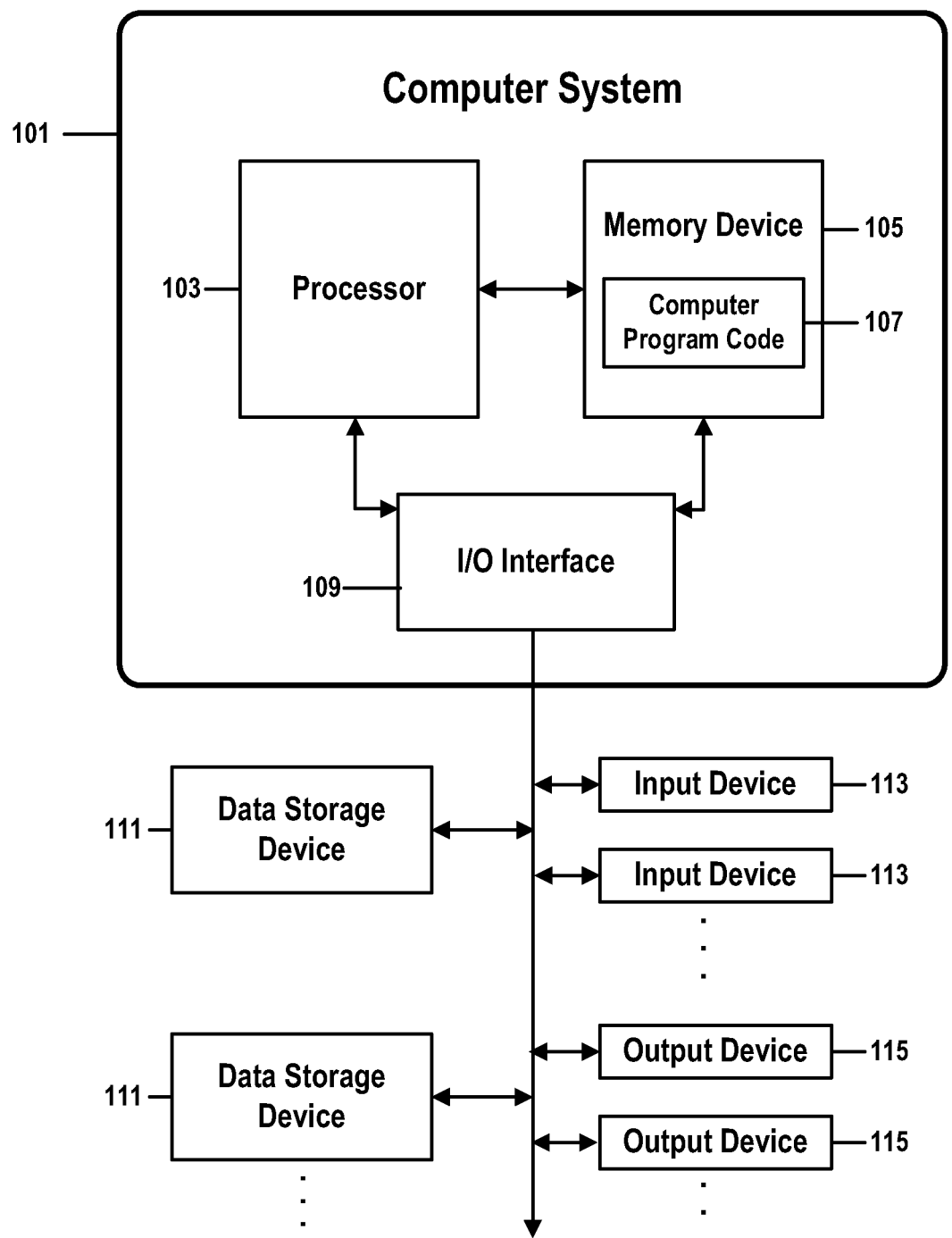
FIG. 1 shows the structure of a computer system and computer program code that may be used to implement a method for automated integration testing with mock microservices in accordance with embodiments of the present invention.

Embodiments of the present invention improve existing technologies for the automated integration testing of a software application that comprises a microservices architecture. As explained above, integration testing requires concurrently testing all, or a significant subset of all, the microservices comprised by the application.

Known methods of integration testing comprise a mock server that has been manually programmed to imitate the behavior of services or applications extrinsic to the application being tested or to the subset of microservices being tested (referred to here, for the purpose of simplicity, as "the tested application"). This mock server tests the tested application by communicating to the tested application input data that the application would receive from the extrinsic services or applications in a real-world implementation. The mock server, or another component of the automated test system, then verifies the correct operation of the tested application by determining whether the tested application responds to the input data by generating expected output.

The mechanism has several disadvantages. It requires the mock server to be manually programmed to produce all possible types of input that the tested application might be expected to receive. If the automated test system uses system calls or standard APIs to query the mock server, in order to determine whether the tested application has responded correctly, then an automated integration procedure may require a large number of synchronous system calls or API calls.

These known automated integration-testing mechanisms also require that the integration tests be written in a manner that differs considerably from unit tests and component tests that might test a single microservice. Because a unit-test or component-test system runs all code required to test a microservice without requiring other microservices to be operational, such a test system has direct, synchronous access to both the code being run and to any mock microservice that would normally run that code. This type of testing is considerably different than automated integration testing, where a mock server runs independently of the test system. While an automated integration-testing requires manually programming test behavior into the mock server in advance, an automated unit-testing application can dynamically adapt its test procedures during testing as a function of a tested unit's responses to the mock services.

Other drawbacks of known automated integration-testing systems include:

the need for the mock server, not the test system, to manage the mock server's behavior during testing. This is necessary in order to allow multiple instances of the mock server to operate concurrently when exhibiting identical test behavior;

a requirement for the test system to continuously poll the mock server or some other monitoring component in order to keep track of the current state of the mock server;

a requirement for the test system to have knowledge of the logical or physical addresses of the tested application; and burdensome complexity when attempting to concurrently run several tests that each require the mock server to exhibit different behavior.

The present invention comprises a software module of an automated application-testing mechanism that is adapted to provide a more efficient, accurate, and robust method for performing integration testing upon applications designed with a microservices architecture. This inventive concept improves upon existing microservice integration-testing functions of application-testing technologies by storing testing behavior in a "behavior store" component of the integration-testing system, rather than in the mock server. As a result, when the mock server receives a service request or other output from the tested application, it is the test system, not the mock server itself, that determines the mock server's response. This allows integration-testing procedures to be designed and performed in a manner analogous to those of unit tests.

Another way that the present invention improves current automated integration-testing technology is by providing an integration-testing system architecture comprising a mock server that requests direction from the test system whenever a tested application requires a response from the mock server. In other words, when the mock server receives a service request from the tested application, the mock server determines how to service that request by making a corresponding request to the test system.

The test system determines how to service such requests from the mock server by referring to an integrated behavior store that identifies how the mock server should respond to each type of call or request received from the tested application. The test system may dynamically reconfigure the behavior store as the test runs, allowing the mock server's behavior to be modified on the fly in response to changing test conditions and in response to requests, functional output, messages, and other content received from the mock server.

Another improvement is that the behavior store may interface to other components of the test system in a manner similar to that used for mock services during unit testing. For example, the test system may query or otherwise access the behavior store by means of calls to existing process-mocking libraries like the JavaScript unit-test development facility Sinon.JS. This allows the present invention to run integration test scripts by means of technologies and techniques similar to those used to generate and run unit tests. This advantage also facilitates development and maintenance of integration test scripts by allowing integration tests to be written in formats and styles similar to those of unit tests. For all these reasons, the present invention allows the development of integration test scripts that comprehensively describe a tested unit's expected behavior under test in an easily understandable manner.

Finally, because the mock server is stateless, the present invention allows multiple instances of a mock server to run concurrently without requiring a distinct process or service to store each instance's current state. This is an important advantage on cloud-computing platforms when integration testing requires multiple copies of a test-system service. Requiring the provisioning of an additional service to store each mock-server state would add testing complexity by introducing additional points of failure. This advantage is even more important if the mock service is used to test the tested application in a production environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for automated integration testing with mock microservices in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for automated integration testing with mock microservices in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for automated integration testing with mock microservices.

Any of the components of the present invention could be created, integrated, hosted, maintained, deployed, managed, serviced, supported, etc. by a service provider who offers to facilitate a method for automated integration testing with mock microservices. Thus the present invention discloses a process for deploying or integrating computing infrastructure, comprising integrating computer-readable code into the computer system 101, wherein the code in combination with the computer system 101 is capable of performing a method for automated integration testing with mock microservices.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for automated integration testing with mock microservices may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for automated integration testing with mock microservices is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
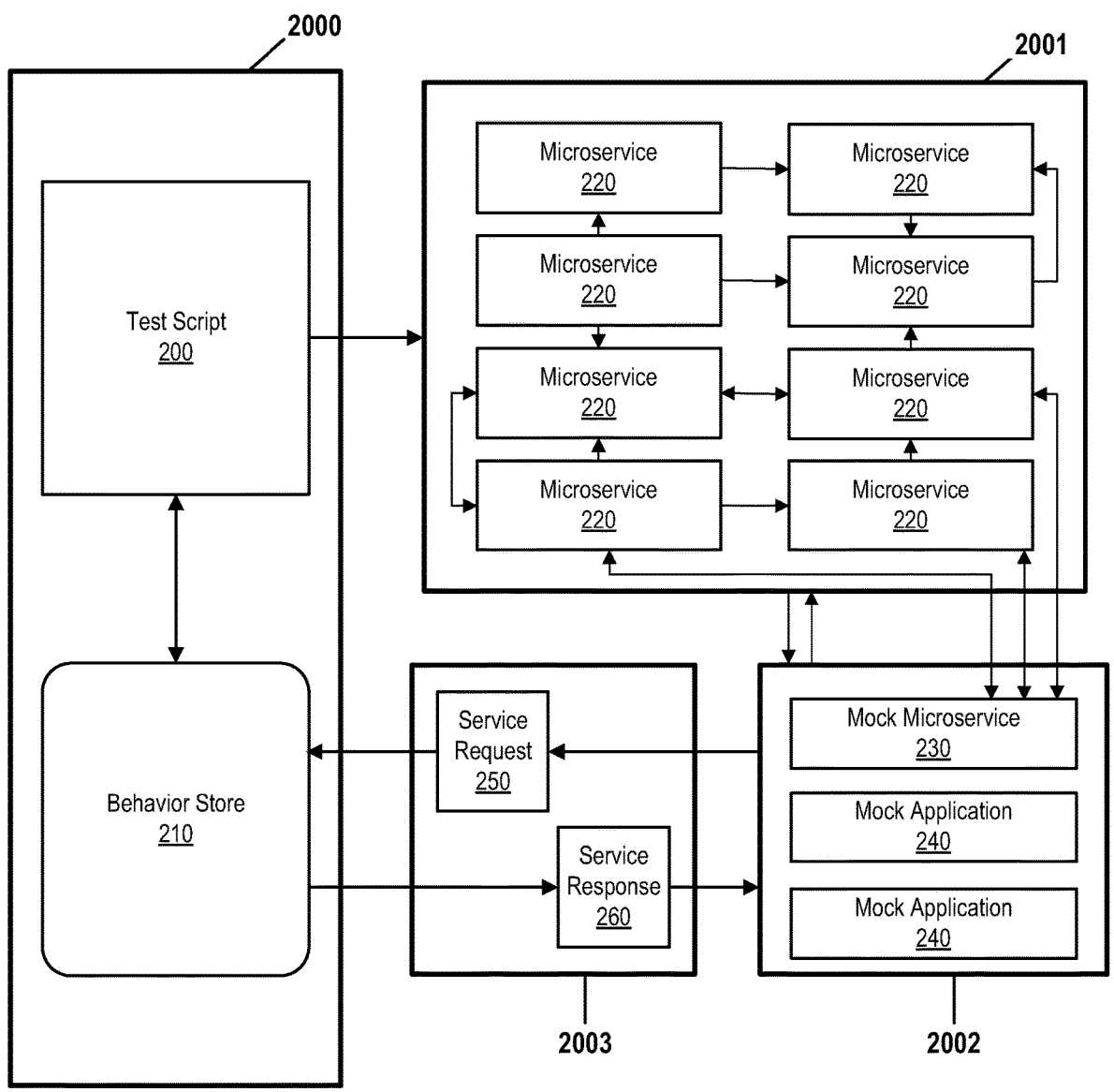
FIG. 2 shows an architecture of a microservices integration-test system in accordance with embodiments of the present invention.

FIG. 2 shows an architecture of a microservices integration-test system in accordance with embodiments of the present invention. FIG. 2 shows elements identified by reference numbers 200-260 and 2000-2003.

The exemplary system of FIG. 2 may perform integration testing of a microservices-based tested application 2001. This testing may be part of a development or implementation workflow, in order to verify the correct operation of a new application, or during actual production, to confirm the current health of an installed system.

FIG. 2 shows a test system 2000 that performs integration testing on a microservices-based tested application 2001. During testing, a mock server 2002 directs "mock" software entities 230-240 to exchange service requests 250 and responses 260 with tested application 2001. This procedure is controlled by test system 2000, which communicates with mock server 2002 through a messaging system 2003. Test system 2000 identifies responses 260 that allow each mock entity 230-240 to emulate behavior that the tested application 2001 would receive from corresponding real-world systems during actual production operation.

Test system 2000 comprises a test script 200 that describes steps comprised by the integration test, and a behavior store 210 that identifies how the mock software entities 230-240 should respond to service requests 250 received from tested application 2001 during testing. Test system 2000 uses the test script 200 to continually update the behavior store 210 in response to receiving service requests 250 and in response to changes in the state of the tested application 2001.

The tested application 2001 is composed of a set of microservices that each performs a discrete set of operations. Each microservice may function independently of other microservices, interoperating as black boxes that communicate only through formal interfaces.

Integration testing verifies the correction operation of a subset 220 of these microservices by testing the tested subset 220 in aggregate as a single integrated software object. This procedure comprises receiving and responding to service requests sent by the subset 220 and verifying that the tested subset 220 behaves correctly under real-world conditions. In some cases, a subset may comprise the entire tested application 2001.

Any microservices of the tested application 2001 that are not being tested may exchange formal communications with mock microservices 230 that emulate the operation of the untested microservices. These mock microservices 230 communicate with the tested microservices 220 during testing through the tested application 2001's standard internal interfaces.

External applications, computerized systems, physical or virtual infrastructure components, or other extrinsic entities with which tested application 2001 might be expected to communicate during normal operation may likewise be replaced by mock applications 240 that emulate the operation of such extrinsic entities. Like mock microservices 230, mock applications 240 communicate with the tested application 2001 through the standard interfaces originally designed into tested application 2001.

Each mock microservice 230 and mock application 240 is thus programmed to act as a proxy for a real-world internal microservice or external entity, exchanging communications with the tested microservices 220 through those components' standard interfaces, so as to duplicate the actual operating environment of the tested components. By observing the operation of the tested microservices 220 under these conditions, test system 2000 may then determine whether the tested microservices 220 interact correctly with their environment under normal operating conditions.

Mock microservices 230 and mock applications 240 are created and managed by mock server 2002 in accordance with rules, guidelines, or other descriptions of the mocked components' behavior contained in behavior store 210. This decoupled architecture allows test system 2000 to update behavior store 210 on the fly during testing in response to a particular request 250 made by tested application 2001. Embodiments of the present invention can thus react to the behavior of tested application 2001 by dynamically changing the behavior of test system 2000 during the actual performance of an integration test.

Embodiments of the present invention are flexible enough to accommodate any communications mechanism between test system 2000 and mock server 2002. In the example of FIG. 2, this communications mechanism comprises a discrete messaging system 2003 (such as a pub/sub system or polling system) that exchanges communications between behavior store 210 (which identifies how mock components 230 and 240 should respond to service requests 250 received from tested application 2001), and mock server 2002 (which directly controls the operation of mock microservices 230 and mock applications 240).

This decoupled approach offers the following advantages:
- neither test system 2000 nor mock server 2002 needs to be programmed with each other's addresses;
- communications between test system 2000 and mock server 2002 are event-driven, thus allowing test program 2000 to always be available to service tested application 2001; and
- the integration-testing platform as a whole is more tolerant of temporary network outages.

In FIG. 2, when the tested application 2001 communicates a service request 250 to a mock microservice 230 or mock application 240, the mock server responds by forwarding the service request 250 to test system 2000 through the messaging system 2003. Conversely, test system 2000 responds to a service request 250 by returning a service response 260 to the mock server 2002 through the messaging system 2003. Mock server 2002 then directs a mock microservice 230 or mock application 240 to return the response to the tested application 2001. In both cases, the service request 250 or service response 260 is communicated between the mock server 2002 and the behavior store 210 of the test system 2000 by means of messaging system 2003.

This approach allows test system 2000 to continuously monitor the state of tested application 2001 by tracking each service request 250 sent by a tested microservice 220 to a mock microservice 220. Test system 2000 can therefore keep track of the current state of mock server 2002 and of tested application 2001 at all times during the integration-testing effort and can use information contained in test script 200 to update behavior store 210 (and, indirectly, the behavior of mock microservices 230 and mock applications 240) as required during testing. This asynchronous mechanism also allows behavior store 210 to pause testing while waiting for the test system 2000 to identify, from test script 200, an appropriate service response 260.

Figure 3:
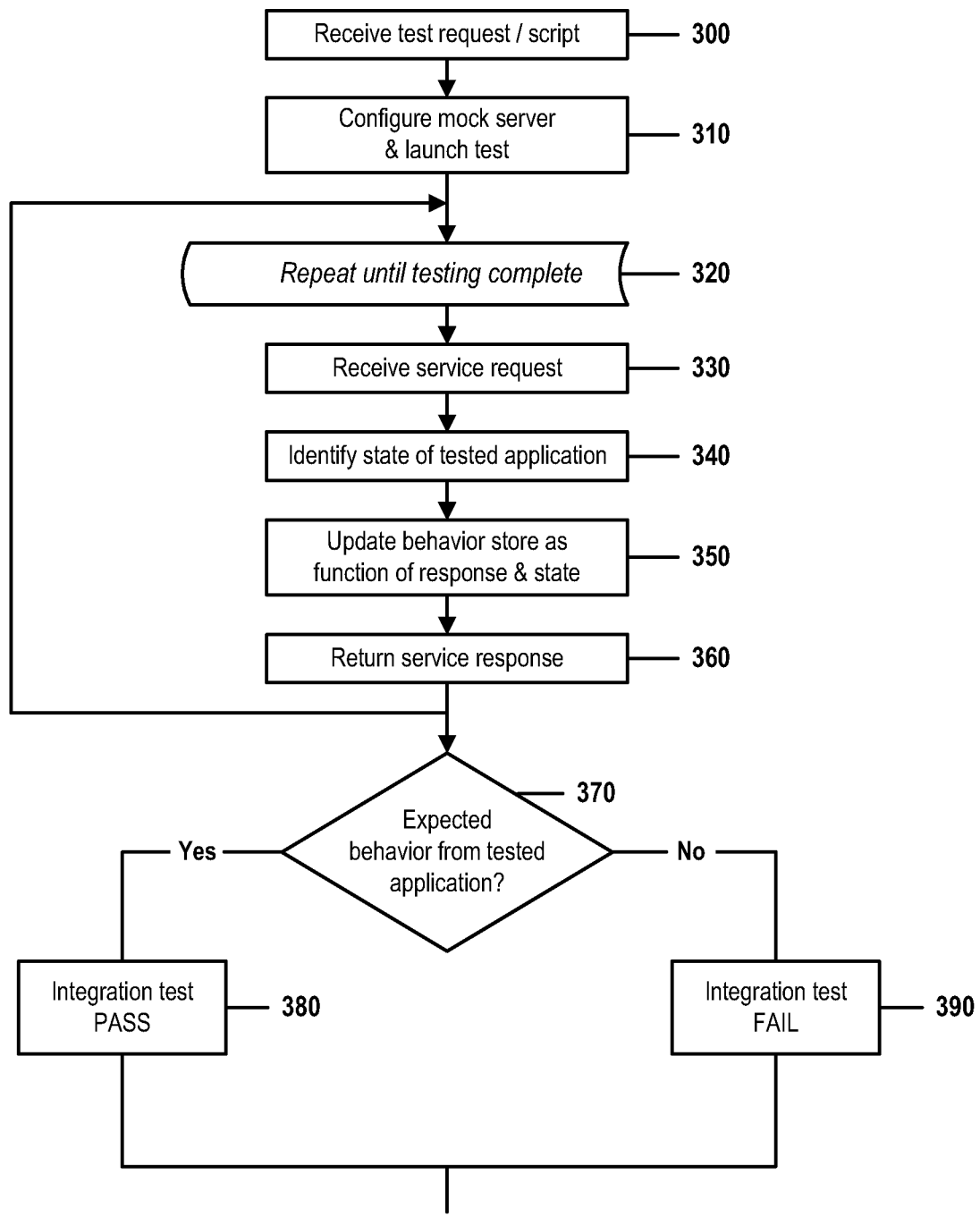
FIG. 3 shows an example of a test script in accordance with embodiments of the present invention.

FIG. 3 is a flow chart that illustrates steps of a method for automated integration testing with mock microservices in accordance with embodiments of the present invention. FIG. 3 contains steps 300-390.

In step 300, an integration-testing system 2000, which may be implemented as a software module or component of a comprehensive automated application-testing mechanism, receives from the automated application-testing mechanism a request to perform an integration test on a tested application 2001 that comprises a microservices architecture. This request may include test details that may not already be available to test system 2000, such as a test script 200, a test schedule, descriptions of resources to be used for testing, characteristics of formal interfaces through with the tested application 2001 may communicate with external hardware or software systems, and other characteristics of the application to be tested 2001.

If the integration test will be testing only a subset 220 of the microservices comprised by tested application 2001, the request may also identify the tested subset 220, the untested microservices of tested application 2001, and characteristics of the interfaces through which the tested subset 220 communicates with the untested microservices.

In step 310, the test system 2000 sets up the integration test. This step may include configuring and launching a mock server 2002 that in turn launches any mock microservices 230 and mock applications 240 that will communicate with the tested subset 220 of microservices.

Set-up may also comprise other configuration steps, such as initializing behavior store 210 with test steps derived from the test script 200. This initial configuration of behavior store 210 may allow the behavior store 210 to respond to initial service requests 250 received from the tested subset 220.

Test system 2000 then launches the test in accordance with guidelines specified in the received test request or in test script 200.

Step 320 begins an iterative procedure of steps 320-360. Each iteration is triggered when the test system 2000 receives a service request 250 from the tested subset 2001. The iterative procedure ends at the conclusion of the integration test.

In step 330, the test system 2000 receives a service request 250 from the tested subset 220. This service request 250 is sent by the tested subset 220 to a mocked entity 230 or 240 in accordance with conventions of a standard interface defined by the design of the tested application 2001.

In one example, a tested subset 220 of an e-commerce program may comprise a subset of microservices that provide order-processing functionality to the e-commerce program. This tested order-processing subsystem may be designed to communicate with a user-input microservice of the e-commerce program and with an external database application, neither of which are subjects of the integration test. In accordance with principles of microservice software design, the user-input microservice would communicate with the tested order-processing subsystem only through one or more strictly defined interfaces, exchanging communications as black-box software modules. All of this information would be provided to the test system 2000, possibly as part of the test request received in step 300.

In step 310 of this example, the mock server 2002 would launch a mock microservice 230 that emulates the operation of the real-world user-input microservice. This mock microservice 230 would communicate with the tested order-processing subsystem through the tested application's standard interface mechanism. The mock server 2002 would also create and operate a mock application 240 that emulates the operation of the real-world extrinsic database application. Again, this mock application 240 would communicate with tested subset 220 through the tested application's standard interface. If configured correctly, the tested subset 220 would not be able to tell that the mock entities 230 and 240 were not actually the real-world software modules that the mock entities replace.

In this example, step 330 might comprise the sub-steps:
a tested microservice 220 of the tested order-processing subsystem attempts to retrieve a user account number from the external database by sending a service request 250 that consists of a database query. This query conforms in format and content to a standard interface format, designed into the e-commerce application, by which the requesting microservice normally accesses the database;
the query 250 is intercepted by the mock database application 240, which operates under the control of mock server 2002
the mock server forwards the service request 250 to the test system 2000. This communication may be performed through a discrete messaging system 2003, such as a publish-subscribe system or other type of messaging system known in the art. The present invention is flexible enough to also accommodate any other known communications mechanism desired by an implementer; and
test system 2000 receives the service request 250 by means of the messaging system or other communications mechanism 2003.

In optional step 340, the test system 2000 identifies the current state of tested application 2001 or tested subset 220 of tested application 2001. This identification may be performed by analyzing prior communications with the tested subset 220 received during the integration test or through any other means known in the art, such as by intercepting error messages or log entries before or during the integration test.

In step 350, test system 2000, if necessary, updates the contents of behavior store 210. This updating may be necessary if the behavior store 210 does not contain rules, guidelines, or other content capable of identifying an appropriate service response 260 to service request 250.

Test system 2000 might require such updating if necessary for the test system 2000 to determine how to respond to tested subset 220 when tested subset 220 is in an unexpected state. For example, if tested subset 220 was determined in step 340 to be in an error state or to have detected suspicious user input, behavior store 210 may require additional content that is directed to error-management communications or to high-security fraud-prevention protocols.

Updating may also be necessary if behavior store 210 does not contain information pertinent to the specific service request 250 received in step 330. This may occur, for example, it a tested subsystem can generate so many distinct service requests 250 that the behavior store 210 does not have the capacity to store logic related to servicing every possible request 250.

In some embodiments, this updating may be performed by transferring information from the test script 200 to the behavior store 210. This information may, by any means known in the art, be reformatted, abridged, elaborated, or otherwise transformed if necessary to address specific requirements of the most recently received service request 250.

In other cases, the updating may be performed as a function of information retrieved from other sources. For example, servicing the query service request 250 for a user account number might require the test system 2000 to query a real database application in order to retrieve an actual account number or a dummy number that is formatted in an expected manner.

Other embodiments may use any means known in the art to dynamically update behavior store 210 during integration testing, as needed in order to ensure that behavior store 210 responds to a service request 250 with an appropriate and authentic service response 260.

In step 360, test system 2000 responds to the service request 250 received in step 340 by returning an expected service response 260 to the tested subset of microservices 220. This response is selected by the test system 2000, as a function of the current contents of the behavior store 210, so as to most closely match a response that would be expected from the mock entity 230 or 240 to which the service request 250 had originally been directed.

In the preceding example, this response 260 might consist of the user account number requested by the tested subset 220 in step 330. This response would be returned to the requesting subset 220 through a path similar to that through which the service request 250 had traveled in step 330. That is, test system 2000 would send the response 260 through messaging system 2003 to mock server 2002. Mock server 2002 would then direct mock database application 240 to return the user account number to the requesting microservice or subsystem, such that the returned message conformed to conventions of the e-commerce system's standard interface.

The iterative procedure of steps 320-360 ends when the integration test is complete. This may occur when all tasks of the test script have been performed or when it is determined that the test cannot proceed because of unexpected test conditions or test errors. At this point, the method of FIG. 3 concludes with steps 370-390.

In step 370, test system 2000 determines whether the tested subset 220 exhibited expected behavior during the integration test. This expected behavior may be defined by the test script 200, by a design specification, by a set of standards or conventions, by a lack of error detections, or by any other means known in the art. The exhibited behavior may comprise the set or sequence of service requests 250 or other communications received from the tested subset 220, or may comprise other received or retrieved information about the state of the tested subset 220 during the integration test.

In step 380, if the test system 2000 in step 370 determined that the subset 220 correctly exhibited expected behavior during the integration test, test system 2000 notifies the automated application-testing mechanism that the tested subset 220 has passed the integration test.

In step 390, if the test system 2000 in step 370 determined that the subset 220 did not correctly exhibit expected behavior during the integration test, test system 2000 notifies the automated application-testing mechanism that the tested subset 220 has failed the integration test.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A method for emulation-based automated integration testing of a microservices-architecture application, the method comprising:
    launching, by an integration-testing system, a mock software entity,
        where the application comprises a pluarality of microservices that are each capable of operating as a standalone process and that are each capable of being tested independently,
        where the plurality of microservices comprises multiple pairs of microservices,
        where each pair of microservices, selected from the plurality of microservices, is capable of communicating with each other only through a predefined channel that is specific to that pair of microservices,
        where the mock software entity comprises an interface mechanism of a production software entity that exchanges data in a production environment with a first microservice of the set of microservices;
    forwarding to the first microservice, by the system, a first response to a first service request,
        where the first service request, after being sent by the first microservice to the production software entity, is intercepted by the system and redirected to the mock software entity, and
        where the first response is received by the system from the mock software entity in response to receiving the first service request;
    detecting, by the system, whether the first microservice produces a desired output after receiving the first response;
    repeating the launching, forwarding, and detecting for all microservices of the plurality of microservices, that have not yet been subject to the launching forwarding, and detecting, and for all production software entities known to exchange data in the production environment with any microservice of the set of microservices;
    determining, by the system, whether all microservices of the plurality of microservices produced desired output during all of the forwarding and detecting steps; and
    reporting, by the system, that the application has passed the automated integration testing if all microservices of the plurality of microservices produced desired output during all of the forwarding and detecting steps.

2. The method of claim 1, further comprising:
    the system launching a mock server that intercepts and forwards communications between the system and the mock entity.

3. The method of claim 2, where the mock server intercepts and forwards communications between the system and the first microservice.

4. The method of claim 2, where the mock server determines how the mock entity responds to service requests.

5. The method of claim 1,
    where the mock entity emulates an untested microservice of the tested application,
    where the untested microservice is a standalone process that is not intended to be tested by the integration-testing system, and
    where the untested microservice is capable of communicating with a microservice of the plurality of microservices.

6. The method of claim 1, where the system communicates with the mock server through a publish-subscribe messaging system.

7. The method of claim 1,
    where the automated application-testing system comprises a behavior store,
    where contents of the behavior store determine each service response sent to a service request forwarded by the system to the mock server, and
    where the behavior store is dynamically updated during the integration testing in accordance with a test script that enumerates a test procedure implemented by the system.

8. The method of claim 1, further comprising providing at least one support service for at least one of creating, integrating, hosting, maintaining, and deploying computer-readable program code in the computer system, wherein the computer-readable program code in combination with the computer system is configured to implement the launching, the forwarding, the detecting, the repeating, the determining, and the reporting.

9. An integration-testing system comprising a processor, a memory coupled to the processor, and a computer-readable hardware storage device coupled to the processor, the storage device containing program code configured to be run by the processor via the memory to implement a method for emulation-based automated integration testing of a microservices architecture, the method comprising:
    launching a mock software entity,
        where a microservices-architecture application comprises a plurality of microservices that are each capable of operating as a standalone process and that are each capable of being tested independently,
        where the plurality of microservices comprises multiple pairs of microservices,
        where each pair of microservices, selected from the plurality of microservices, is capable of communicating with each other only through a predefined channel that is specific to that pair of microservices, where the mock software entity comprises an interface mechanism of a production software entity that exchanges data in a production environment with a first microservice of the plurality of microservices;

forwarding to the first microservice, by the system, a first response to a first service request,
where the first service request, after being sent by the first microservice to the production software entity, had been intercepted by the system and redirected to the mock software entity, and
where the first response was received by the system from the mock software entity in response to receiving the first service request;

detecting, by the system, whether the first microservice produces a desired output after receiving the first response;

repeating the launching, forwarding, and detecting for all microservices of the plurality of microservices, that have not yet been subject to the launching forwarding, and detecting, and for all production software entities known to exchange data in the production environment with any microservice of the plurality of microservices;

determining, by the system, whether all microservices of the plurality of microservices produced desired output during all of the forwarding and detecting steps; and reporting, by the system, that the application has passed the automated integration testing if all microservices of the set of microservices produced desired output during all of the forwarding and detecting steps.

10. The system of claim 9, further comprising:
the system launching a mock server that intercepts and forwards communications between the system and the mock entity.

11. The system of claim 10, where the mock server intercepts and forwards communications between the system and the first microservice.

12. The system of claim 10, where the mock server determines how the mock entity responds to service requests.

13. The system of claim 9,
where the mock entity emulates an untested microservice of the tested application,
where the untested microservice is a standalone process that is not tested by the integration-testing system, and
where the untested microservice is capable of communicating with a microservice of the plurality of microservices.

14. The system of claim 9, where the system communicates with the mock server through a publish-subscribe messaging system.

15. A computer program product, comprising a computer-readable hardware storage device having a computer-readable program code stored therein, the program code configured to be executed by an integration-testing system comprising a processor, a memory coupled to the processor, and a computer-readable hardware storage device coupled to the processor, the storage device containing program code configured to be run by the processor via the memory to implement a method for emulation-based integration testing of a microservices-architecture application, the method comprising:
launching a mock software entity,
where the microservices-architecture application comprises a plurality of microservices that are each capable of operating as a standalone process and that are each capable of being tested independently,
where the plurality of microservices comprises multiple pairs of microservices,
where each pair of microservices, selected from the plurality of microservices, is capable of communicating with each other only through a predefined channel that is specific to that pair of microservices,
where the mock software entity comprises an interface mechanism of a production software entity that exchanges data in a production environment with a first microservice of the plurality of microservices;

forwarding to the first microservice, by the system, a first response to a first service request,
where the first service request, after being sent by the first microservice to the production software entity, is intercepted by the system and redirected to the mock software entity, and
where the first response was received by the system from the mock software entity in response to receiving the first service request;

detecting, by the system, whether the first microservice produces a desired output after receiving the first response;

repeating the launching, forwarding, and detecting for all microservices of the plurality of microservices, that have not yet been subject to the launching forwarding, and detecting, and for all production software entities known to exchange data in the production environment with any microservice of the plurality of microservices;

determining, by the system, whether all microservices of the plurality of microservices produced desired output during the forwarding, and detecting interactions; and reporting, by the system, that the microservices-architecture application has passed the automated integration testing if all microservices of the plurality of microservices produced desired output during the forwarding and detecting interactions.

16. The computer program product of claim 15, further comprising:
the system launching a mock server that intercepts and forwards communications between the system and the mock entity.

17. The computer program product of claim 16, where the mock server intercepts and forwards communications between the system and the first microservice.

18. The computer program product of claim 16, where the mock server determines how the mock entity responds to service requests.

19. The computer program product of claim 15,
where the mock entity emulates an untested microservice of the microservices-architecture application,
where the untested microservice is a standalone process that is not tested by the integration-testing system, and
where the untested microservice is capable of communicating with a microservice of the plurality of microservices.

20. The computer program product of claim 15, where the system communicates with the mock server through a publish-subscribe messaging system.

* * * * *